May 15, 1962 R. H. DENGLER 3,034,608
SHEET STIFFENING STRINGER
Filed March 3, 1959
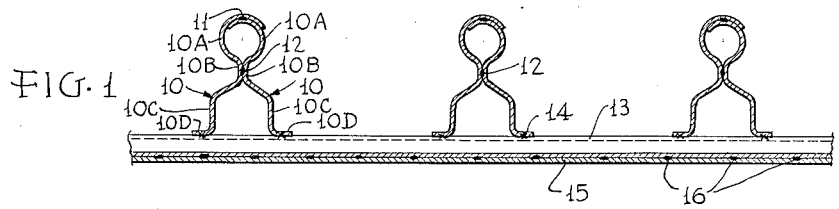
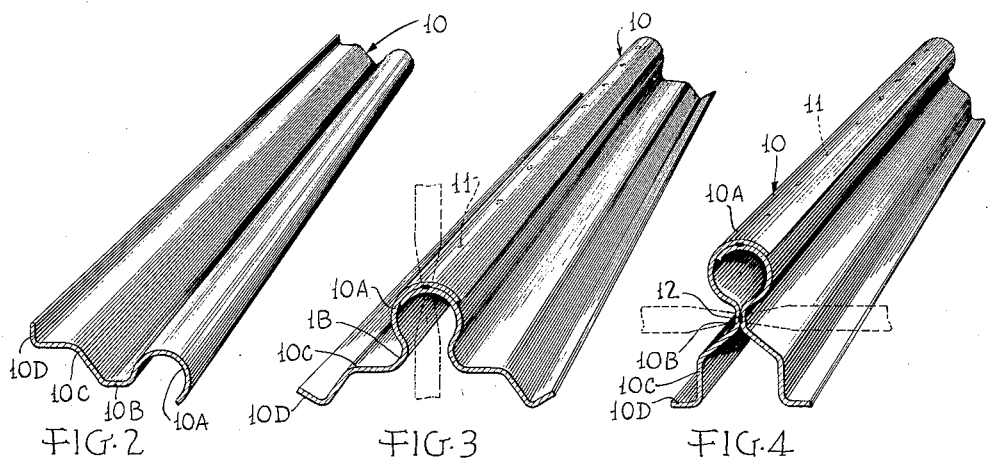
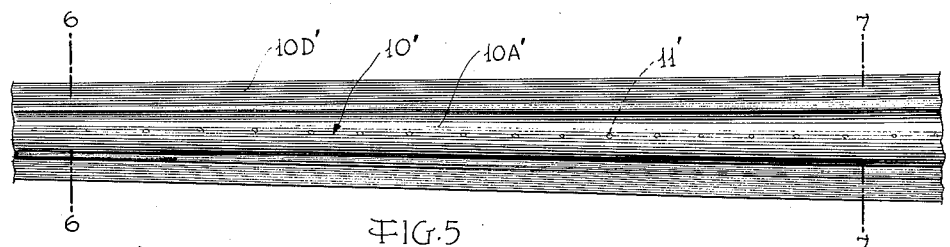
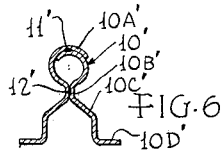
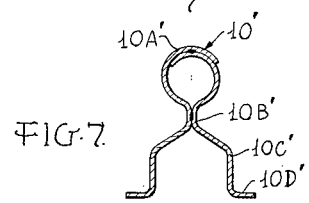
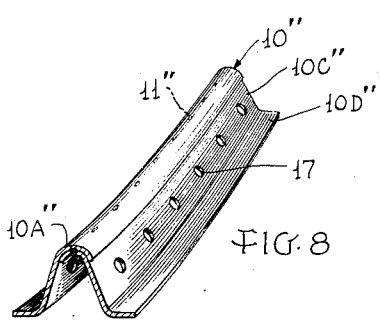
INVENTOR
Reeves H. Dengler.
BY Wm. R. Glisson
ATTORNEY

United States Patent Office 3,034,608
Patented May 15, 1962

3,034,608
SHEET STIFFENING STRINGER
Reeves H. Dengler, Oreland, Pa., assignor to The Budd Company, Philadelphia, Pa., a corporation of Pennsylvania
Filed Mar. 3, 1959, Ser. No. 796,965
2 Claims. (Cl. 189—34)

This invention relates to a sheet stiffening stringer, especially for air and space craft airfoils, and has for an object the provision of improvements in this art.

One of the particular objects of the invention is to provide a stringer which can easily be formed by roller drawing to avoid the slow operations and limited lengths which can be formed with a press brake.

Another object is to provide a stringer which has a large and readily variable outer cross-section thus providing a high bending moment about an axis disposed inwardly of its outer edge.

Another object is to provide a stringer which can be made in variable size from one end to the other.

Another object is to provide a stringer of such design that transverse formations can readily be imparted after it has been given its final outline shape.

The above and other objects and advantages of the invention will be apparent from the following description of an exemplary embodiment, reference being made to the accompanying drawings wherein:

FIG. 1 is a transverse section through part of an airfoil embodying the invention;

FIG. 2 is a perspective view of a component of a stringer;

FIG. 3 is a perspective view of two stringer components being welded together;

FIG. 4 is a perspective view of the two components being welded together on the side;

FIG. 5 is a top plan view of a completed tapered stringer;

FIG. 6 is a transverse section taken on the line 6—6 of FIG. 5;

FIG. 7 is a transverse section taken on the line 7—7 of FIG. 5; and

FIG. 8 is a perspective view of a curved stringer.

As shown in FIGS. 2, 3 and 4, stringer components or elements 10 can be formed by a roll draw bench or by a press brake. The shape of each component is open so that it is well adapted to be formed in any lengths for which sheet stock can be obtained—from rolls, for example. In limited lengths it can easily be formed on a press brake. If formed in unlimited lengths it can be cut to any lengths desired without any waste of material.

The components 10 have arcuate heads 10A, flat sides 10B, outwardly-extending legs 10C and feet 10D.

The heads 10A can be lapped to any extent desired and welded together, as shown at 11 in FIG. 3. This avoids the necessity of making stringers of different thickness in cross section or of welding in doublers to get the desired sectional area at the head for a high moment of inertia, as has heretofore been necessary.

As shown in FIG. 4, the components are next brought together and welded through the sides 10B at 12 to form the stringer.

The stringers can be welded directly to a skin sheet or can be welded to rib elements 13 at 14, as shown in FIG. 1, and these rib elements welded to a skin sheet 15 by welds 16.

As shown in FIG. 5 the components 10' can be made in tapered shape in limited lengths either by a roll draw bench with arcuately variable turnable roll elements or by a press brake. When made by these or any other methods the stringers are much easier to make by reason of being made in separate components instead of in a single piece.

FIG. 8 shows how a sombrero section stringer can be formed from components 10'' which are stretch bent to arcuate shape before being welded together in the overlapped arcuate head portions 10A''. It is easy to stretch bend these components in their simple shape before being welded together. Also it is easy to form lightening holes 17 or other side shapes in the simple components.

It is thus seen that the invention provides a simple and easily formed stringer which can have the desired extra cross-section area in its head for giving a high moment of inertia. The section area can be varied either by providing more or less material as the components are formed or by varying the head lap as the components are assembled together, depending on the desired final size and shape.

Tapered shapes, curved shapes and side-formed shapes are easy to provide. The components which are reverse duplicates in cross-sectional shape may be made by a single set of forming tools.

While certain embodiments have been described for purposes of illustration, it is to be understood that there can be other embodiments and modifications within the scope of the invention.

What is claimed is:

1. A reinforced doubler head stringer for stiffening skin sheets comprising two separately formed longitudinal components which in stringer cross-section are reverse duplicates in shape, each formed with an arcuate head portion, flat side portion, an outwardly extending leg portion and a foot portion, the head portions of the two components being overlapped in tapered relationship and welded to form a reinforced double sheet thickness wherein said head portions are tapered in circumferential length and diameter along the length of the stringer, the flat portions being welded together to form a stringer which varies in cross-section along its length.

2. The method of making a stringer with a reinforced head comprising the steps of making two formed sheet sections each with an arcuate head portion, a flat side portion, an outwardly extending leg portion, and a foot portion, said sections in cross-section being reverse duplicates, joining the two sections at the arcuate head portion in varied overlapping relationship, bending the two sections at the arcuate head portions until the flat side portions are oppositely disposed, and connecting the flat side portions to provide a symmetric stringer structure with a double thickness tapered arcuate head section.

References Cited in the file of this patent

UNITED STATES PATENTS

| 390,951 | Dow | Oct. 9, 1888 |
| 1,574,563 | Duff | Feb. 23, 1926 |
| 1,946,694 | Hunter | Feb. 13, 1934 |
| 2,403,881 | Tarbox | July 9, 1946 |

FOREIGN PATENTS

| 361,010 | Great Britain | Nov. 19, 1931 |
| 1,102,109 | France | May 4, 1955 |